United States Patent [19]

Groves

[11] Patent Number: 4,903,947
[45] Date of Patent: Feb. 27, 1990

[54] FENCE OR OTHER STRUCTURE VEGETATION BARRIER

[75] Inventor: George D. Groves, Arnold, Mo.

[73] Assignee: B & G Consultants, Inc., Arnold, Mo.

[21] Appl. No.: 188,449

[22] Filed: Apr. 29, 1988

[51] Int. Cl.$^4$ ............................................. E04H 17/06
[52] U.S. Cl. ............................................ 256/32; 256/1
[58] Field of Search .................. 256/32, 1, 33; 47/33; 52/102

[56] References Cited

U.S. PATENT DOCUMENTS

| | | | |
|---|---|---|---|
| 3,806,096 | 4/1974 | Eccleston et al. | 356/32 |
| 3,822,864 | 7/1974 | Keys | 256/32 |
| 4,125,964 | 11/1978 | Waggoner | 47/33 |
| 4,478,391 | 10/1984 | Kovack | 256/32 X |
| 4,497,472 | 2/1985 | Johnson | 256/32 |
| 4,515,349 | 5/1985 | Groves | 256/1 |
| 4,548,388 | 10/1985 | Cobler | 256/32 |
| 4,595,175 | 6/1986 | Kauffman et al. | 256/1 |
| 4,690,382 | 9/1987 | Koperdak | 256/32 X |

Primary Examiner—Randolph A. Reese
Assistant Examiner—Peter M. Cuomo
Attorney, Agent, or Firm—Paul M. Denk

[57] ABSTRACT

A length of integral fence or other building structure associated vegetation barrier, for use for eliminating the growth of grass or weeds, the barrier includes a base member, being of arcuate design, and in two embodiments having an upstanding leg, either centrally or laterally formed thereat, which leg is connected by a living hinge to the base member, the upstanding leg has apertures therethrough for accommodating the connection of a tie device for securing the barrier to the fence, and additional apertures to provide for drainage of moisture therethrough; the barrier may be formed of various polymer chemistry, and may include an ultraviolet light inhibitor, to sustain its life. The various lengths of barriers are interconnectable together, to provide continuous length for the installed barrier, with the base member having provision for insertion of spikes, for securing the barrier to the ground. The base members in conjunction with any upstanding leg provides an accommodating slot for insertion of the next axially adjacent length of barrier therein for providing a continuously installed barrier for locating under a fence or against a building structure to any length.

22 Claims, 2 Drawing Sheets

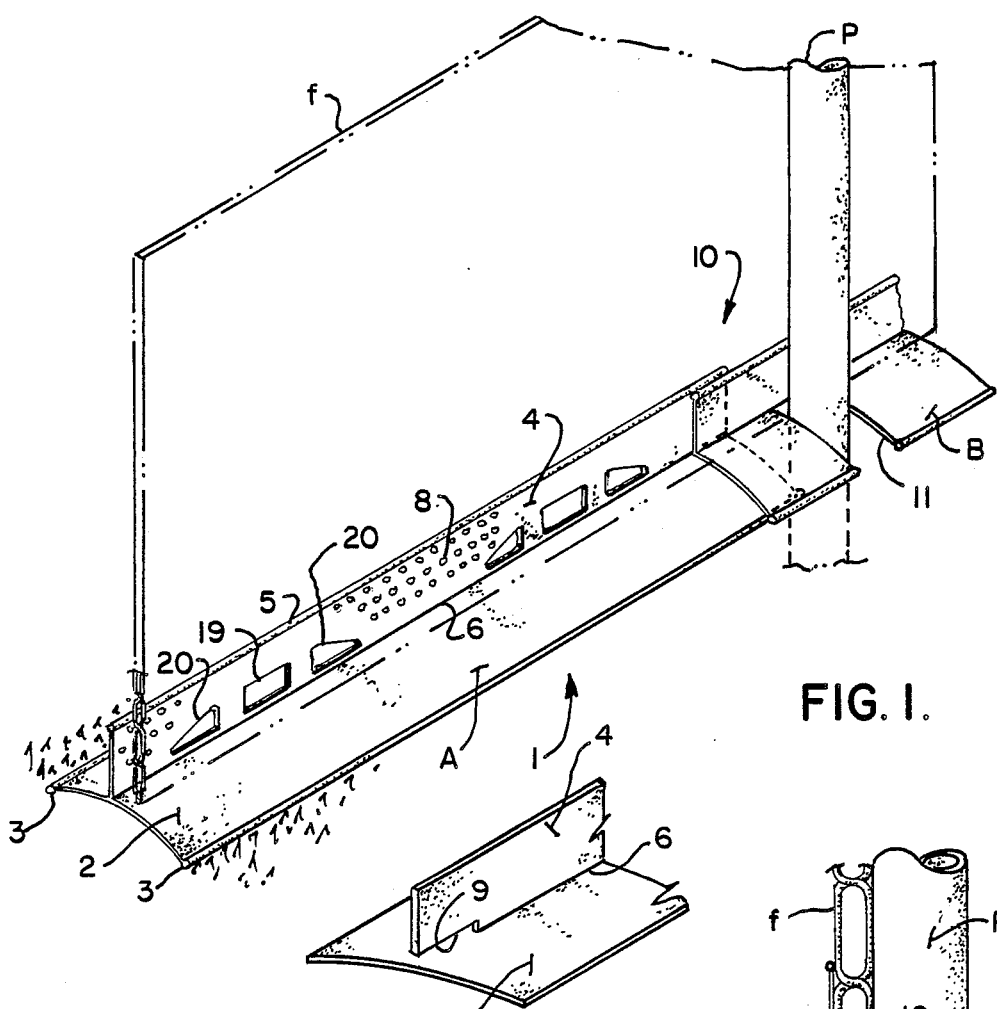
FIG. 1.
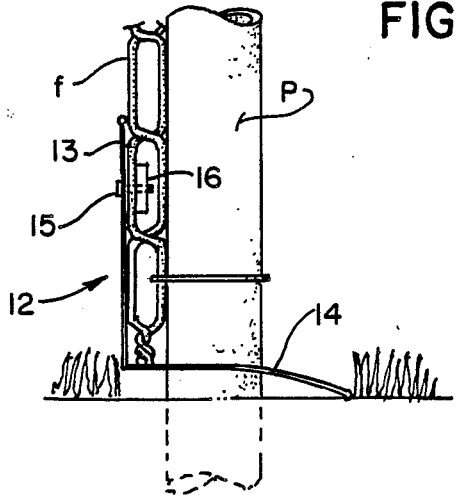
FIG. 1A.
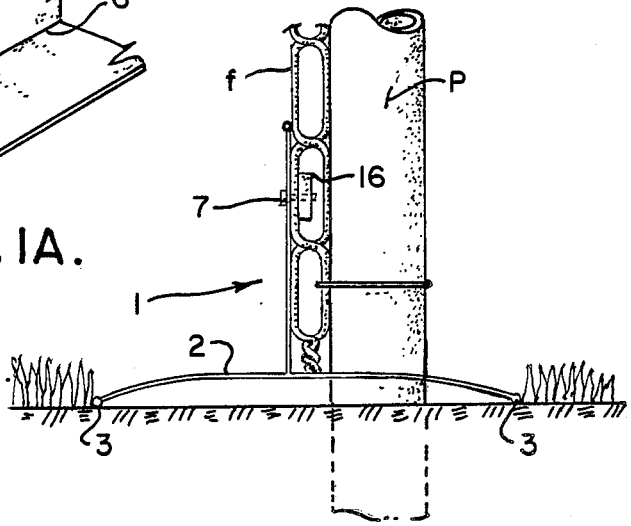
FIG. 2.
FIG. 3.

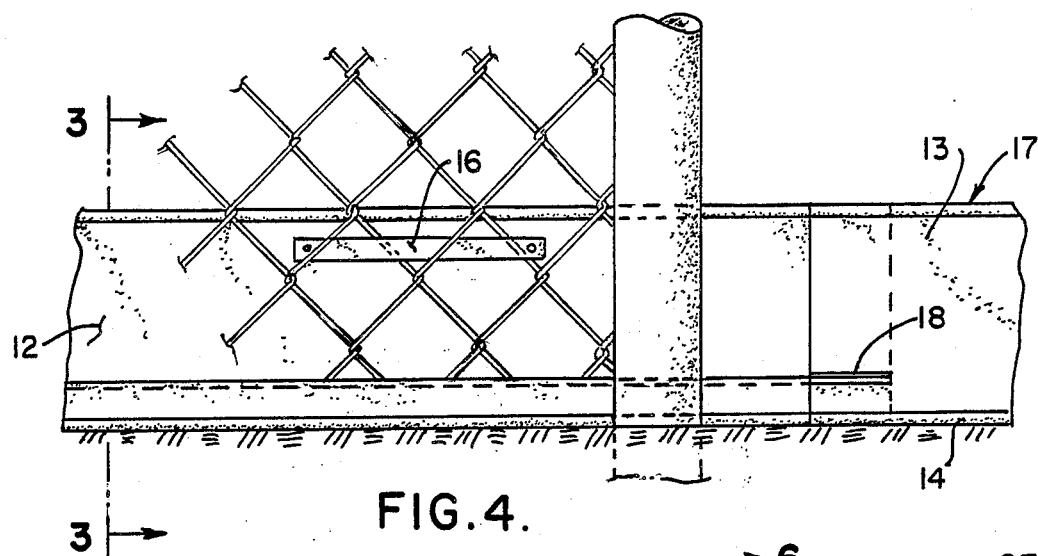
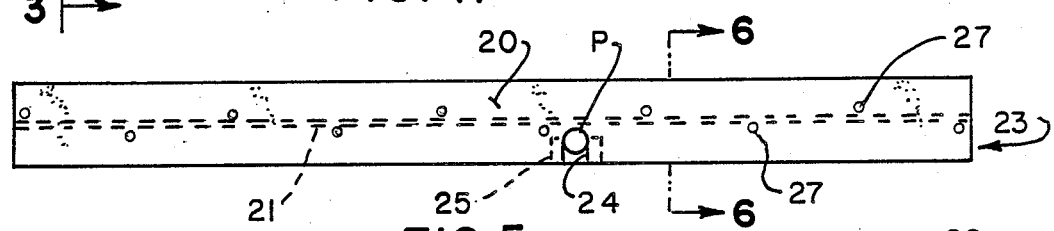
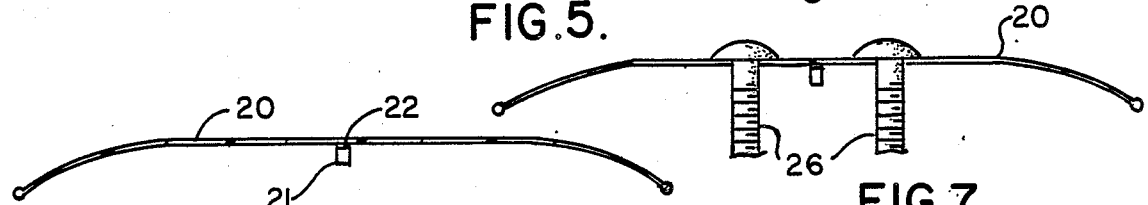
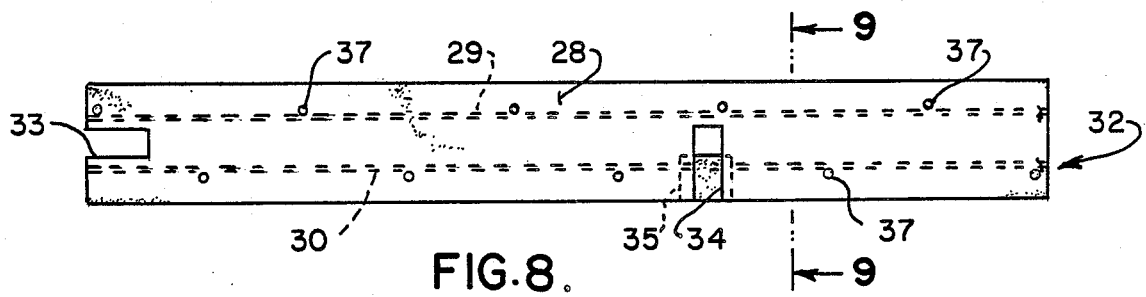
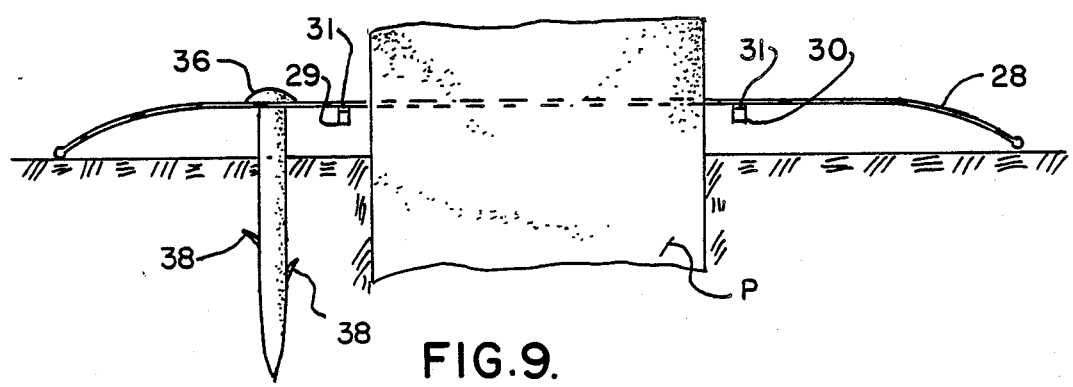

FENCE OR OTHER STRUCTURE VEGETATION BARRIER

BACKGROUND OF THE INVENTION

This invention relates generally to the provision of a vegetation guard or barrier, which is applied in proximity with the lower edge of fencing, or adjacent buildings or other structures, and thereby provide a means for eliminating the growth of any vegetation, grass, or weeds, at such location, to thereby facilitate the cutting of grass, or the weeding, at such location.

A variety of prior art devices, in the nature of vegetation barriers, are available either in published form, or are being marketed. One such is disclosed in my prior U.S. Pat. No. 4,515,349, identified as "An Integral Vegetation Barrier," and which is constructed, as can be seen, incorporating a base member, and an upstanding leg, both of which are integral to each other, this combination capable of being tied to the lower end of fencing, and thereby furnishing a means for eliminating grass or other weeds at such location. My prior device likewise shows drainage openings, provided through the said upstanding leg, in order to allow the passage of any water, such as accumulated rain, therethrough, to prevent a backup of moisture.

Other related types of vegetation barriers are disclosed in the prior patent to Niemann, U.S. Pat. No. 3,713,624, which shows a fence guard, for use for related purposes, to restrict the growth of grass, at the location in the vicinity of the bottom of a fence.

Other related patents showing similar type of structures are disclosed in the patent to Eccleston, U.S. Pat. No. 3,806,906, which shows a fence trim and vegetation barrier, and one which incorporates a rather extendable core member for connecting lengths of the barrier shells together, for interlocking purposes. The patent to Cowles, U.S. Pat. No. 3,768,780, shows another style of fence border Likewise, the patent to Abbe, U.S. Pat. No. 3,515,373, discloses a related type of fence trim guard. The patent to Keys, U.S. Pat. No. 3,822,864, shows a related weed barrier for fencing. The patent to Wright, U.S. Pat. No. 3,393,897, shows various lengths of barrier for use under a fence, generally constructed incorporating cut-outs for facilitating the positioning of the barrier around fence posts. The patent to Snider, U.S. Pat. No. 4,349,989, shows another style of fence guard The patent to Jensen, U.S. Pat. No. 3,545,127, discloses the usage of a lawn edging arrangement which incorporates leg members for embedding within the ground. The patent to Tisbo, U.S. Pat. No. 4,321,769, shows another type of edging strip, which appears to be fabricated of a rubber or plastic The patent to Hair, U.S. Pat. No. 4,219,941, discloses another type of moisture barrier for a tray means.

The uniqueness of the current invention is to provide a vegetation barrier, which is constructed to conveniently provide for its own interconnection together, at the ends of each length of such formed barrier, and thereby furnish a continuous length of barrier under any fencing, or adjacent structure, regardless of the length, to function as a means to prevent the growth of grass or weeds, at the vicinity of the lower edge of the installed fence Another object of this invention is to provide lengths of a vegetation barrier that can be easily installed by a single service man and in a minimum of time.

Still another object of this invention is to provide lengths of polymer extruded vegetation barrier, formed of either polyethylene, polypropylene, or otter resin, and which may include various inhibitors so as to prevent the effects of ultraviolet rays upon the barrier when installed for any considerable length of time.

Another object of this invention is to provide a vegetation barrier which incorporates interlocking means, at their ends, for facilitating the connection of lengths of such barrier together during application.

Still another object of this invention is to provide a vegetation barrier that incorporates various apertures, either for drainage, or for interconnecting with the fencing material, to provide for its permanent installation and application.

Yet another object of this invention is to provide a vegetation barrier which, when installed prevents the growth of grass or weeds in the vicinity of the fence, and therefore gives the yard in which the barrier is installed a rather clean cut and well groomed appearance.

Still another object of this invention is to provide a vegetation barrier which eliminates the need for trimming of grass around the fence where it is installed.

These and other objects will become more apparent to those skilled in the art upon reviewing the summary of this invention, and upon undertaking a study of the description of its preferred embodiment, in view of the drawings.

SUMMARY OF THE INVENTION

This invention contemplates the formation of a vegetation barrier, to various shapes, and which incorporates a base member, in all embodiments, and in select modifications, has an upstanding leg member integrally formed therewith and which projects a sufficient height to provide for interconnection of the vegetation barrier with the proximate fencing under which it is installed. In such embodiment, a tie means, even in conjunction with a connecter strap, is useful for facilitating the permanent installation of the vegetation barrier to the lower end of the fence, for assuring its lasting connection.

In addition to the foregoing, in that embodiment where the vegetation barrier includes the upstanding leg integrally formed, as through extrusion molding, with its attached base member, there may be desirably provided a weakened groove or line at the point of interconnection between the leg and the base member, in order to form a living hinge, to facilitate the foldover of the said upstanding leg, and which provides for ease of storage or shipment. When the barrier is then installed, the upstanding leg will simply resiliently project upwardly, into its installation position, and ready for tying to the fence line. Generally, the upstanding leg and base member of this invention, being extruded of a polymer, normally has a thickness of approximately 0.070 to 0.080 inches but at the location of the formed hinge line, it may be in the vicinity of 0.018 to 0.040, formed by a groove on one or both sides of the point of connection between the leg and the base member, to furnish that lineal line of weakening that facilitates the fold over of the upstanding leg, into proximity upon the base member.

Preferably, this invention is formed, as previously explained, of an extruded polymer, normally of polypropylene copolymers, and more specificall of polypropylene, or it may even be fabricated of a polyurethane or polyethylene, during its construction. Construction of the invention from an elastomer, such as a polyvinyl, is also desirable. Obviously, other resins may be found useful for this intended purpose. Nevertheless, it is also desirable to add as an ingredient to the extrusion material various inhibitors, such as one which strengthens the extruded polymer against ultraviolet rays, which normally have a tendency, over a period of time, to make the resin rather brittle, and which leads to its cracking and deterioration. Such inhibitors have been found very useful when the extruded material may comprise polyethylene. Such materials, for use as a resin extrudate, may be obtained from Himont U.S.A., Inc., of Wilmington, Del. and are normally sold under the trademarks and catalog numbers, Pro-Fax, No. 7723, and No. 7823. For example, the benzophenones are useful for absorbing ultraviolet light and converting it to a harmless form.

In the fabrication of the vegetation barrier, and when it is extruded, the base member is designed to be of a width of anywhere in the vicinity of three inches to six inches, and may even be that a width of nine inches may be desirable. In any event, the base is designed to be of sufficient width to eliminate vegetation growth under or near the bottom of the fence, and likewise allows the ease of movement of at least a lateral segment of the lawn mower, thereupon, in order to provide cutting of any grass that is growing at the edge of the emplaced barrier. Thus, it provides a very clean cut appearance to the fence, with no visible evidence of any weeds, grass or uncut growth, and in addition, does such without necessitating the need for the home owner, or the like, of having to trim at such a location, as currently required Thus, usage of this invention therefore prevents the development of sore knees, or aching backs, to the yard man, or the home owner, as we have all experienced, and furthermore prevents the need for usage of any shears, and the incidence of cuts, abrasions, or blisters, as have well been experienced by everyone.

There are three basic embodiments for the current invention. One is to provide an inverted T-shaped appearing vegetation barrier, which, as previously explained, provides a base member, and an integrally upwardly extending leg. The second embodiment is a L-shaped member, with an upstanding leg, and a single laterally extending leg, which is generally designed for interfitting under the fence, and extending for some width, up to the approximate nine inch size, as previously explained. In the third embodiment, a base member itself is provided, without any upstanding leg, and Which may be spiked to the ground to provide for its permanent installation under the fencing material, and yet function effectively as a vegetation barrier, as previously described. The base member of the invention is designed to be molded having an arcuate shape, or some convexity, along its width, in order to provide that its edges will be significantly biased against the ground, when installed, with the base member being generally flattened, when placed into position, and either tied to the lower segment of the fence, or spiked in place, as previously explained.

Another aspect of this invention is the interlocking feature provided between various lengths of the vegetation barriers. Normally, these lengths may be extruded to six, eight, ten, or more feet in length In the commercial embodiment of the invention ten foot lengths are desired. But, when installing these lengths together, unless means is provided for furnishing continuity to the barrier, when emplaced, there is a likelihood that grass or weeds may grow at these junctions. Hence, interlocking means is provided at least at one end of each of the extruded barrier lengths. In those embodiments incorporating upstanding legs, a slit is provide between the upstanding leg, and the base member, and extends in for some distance, approximately two inches, and provides clearance for insertion of the end of the next axially adjacent length of barrier, when installed into position. The next adjacent length simply has its base member slid into the slot of the just previously installed length of barrier, at its proximate end, and thereby provides an approximate two inch overlap between adjacent barriers, when installed. This can be continued indefinitely, to provide continuity in the application and laying of the barrier under any fencing material, as required.

In those particular embodiments where the barrier is formed of simply a base member, with no upstanding leg, a boss means is formed integrally extending downwardly from approximately the central end and inwardly of each barrier length, with the boss means extending in approximately four inches, more or less, or even substantially across thereof, and incorporates a slot within the boss member, adjacent the undersurface of the contiguous base member, and that slot is designed for accommodating the insertion therein of the axially aligned end of the next length of vegetation barrier, when installed. The boss member is formed as an integrally depending ridge upon the underside of the base member. In another embodiment, a pair of such ridges are provided.

Other features of this invention, as summarized herein, include the usage of the spike means, for additionally affixing the vegetation barrier to the ground, and which generally may be used in cooperation with that particular barrier which also includes the upstanding leg, so as to position the base member into location, in conjunction with the tying of the upstanding leg by means of tie means to the approximate fence. But, the spike means have particular utility when used for installing the singular base member, without the upstanding leg form of vegetation barrier. Obviously, there is no way to tie that particular style of barrier to the fence, and therefore, the usage of a spike means is desirable for affording more permanent installation. The spike means may likewise be extruded or otherwise molded of a polymer material, and incorporate integral barbs, to assure their fixing within the ground, when hammered in place.

In addition, drainage means are designed into the construction of the vegetation barrier of this invention, and particularly that style which incorporates integrally the upstanding leg. These drainage means may include a series of apertures, generally which are punched from the upstanding leg after it has been molded, and to facilitate the drainage of rain or other water therethrough, preferably the drain holes have a wider cut-out portion, in the vicinity of the integral base member, than they need at the top thereof. Thus, this yet provides maximum strength to the formed vegetation barrier, affords the advantages of drainage, as may be required depending upon the contours of the ground upon which the barrier is installed.

In addition, since the vegetation barrier of this invention is formed of a resilient or flexible polymer, where fence posts are encountered during the installation of lengths of this invention, a simple cut-out for clearance for insertion of the fence post therein may be made through the usage of scissors or shears, with the width of the slots simply being cut to slightly greater than the diameter of any fence encountered, to allow the barrier to be slid up into proximity against the post, when installed. Then, a piece of the vegetation barrier simply may be glued or otherwise fastened in overlying relationship with the extended portion of the base member, to adequately seal the location to prevent the growth of any vegetation thereat.

BRIEF DESCRIPTION OF THE DRAWINGS

In referring to the drawings, FIG. 1 provides an isometric view of the vegetation barrier of this invention shown being installed in position under a fence and adjacent its supporting fence post, the two latter of which are shown in phantom line;

FIG. 1A provides an enlarged end view of the barrier of FIG. 1;

FIG. 2 is a end view of the installed vegetation barrier of this invention, as shown in FIG. 1;

FIG. 3 shows an end view of a modification to a vegetation barrier of this invention, being of the L-shaped type;

FIG. 4 is a side view of the vegetation barrier of FIG. 1, as installed, showing the interlocking relationship between axially adjacent ends of a pair of lengths of the formed barrier;

FIG. 5 is a top view of a modification to the vegetation barrier of this invention, being that one formed solely as a base member;

FIG. 6 is a transverse sectional view taken along the line 6—6 of FIG. 5;

FIG. 7 is a similar view to that of FIG. 6, but showing the application of spike mean for affixing the barrier to the ground;

FIG. 8 is a plan view of a modified form of base member style of vegetation barrier of this invention; and FIG. 9 is a transverse sectional view taken along the line 9—9 of FIG. 8, showing one of the spike means securing the vegetation barrier in place, about a fence post.

DESCRIPTION OF THE PREFERRED EMBODIMENT

In referring to the drawings, an in particular FIG. 1, the vegetation barrier 1 of this invention is accurately disclosed, being shown affixed proximate the bottom edge of the fence F, and straddling its supporting post P. The barrier of this invention, as can also be seen in FIG. 2, includes a base member 2, which is fabricated of the materials as previously described, and which is of arcuate or convex configuration, allowing for its beaded edges 3 to rest firmly upon the ground, when installed. Extending integrally upwardly from the approximate central part of the base member 2 is the upstanding leg 4, which may likewise include a bead, as at 5, along its upper edge, for reinforcement purposes. As previously described, a weakened line of integral connection, as approximately at 6, is provided along the length of each section of barrier, one or both sides thereof, and undertakes the type of grooves, at the location of the leg connection with the upper surface of the base member 2, to form the living hinge, as previously explained.

As can be seen in FIG. 1, various lengths of these vegetation barriers, one as shown at A, and an axially adjoining one, as at B, interconnect together, in a manner to be subsequently described, so as to provide a continuous length form of barrier, when installed, depending upon the length of the fence in which it is to be used in conjunction therewith.

During installation, as can be seen in FIG. 2, the barrier 1 interconnects with the fencing F, as attached to its pole P, and this interconnection is obtained through the use of a tie means, as at 7, that extends through select of the variety of apertures, as at 8, of the upstanding leg 4, and secures through a length of strap means 8 for affixing the barrier to the lower segment of the fence, as can be noted. See also FIG. 4. When in this position, as can be seen, the outer edges 3 of the base member 2 are firmly rested upon the ground, the lower convexity of the base member 2 is depressed downwardly, towards the ground, so as to conveniently slide under the bottom of the fence F. and to be affixed into position.

As can be seen in FIG. 1, in addition to FIG. 1A, various lengths of the barriers are interfitted together, with each length of barrier having a slot, as at 9, formed proximate one end, and extending inwardly at the location between the upright leg 4, and the base member 2, so that the opposite end of each length of barrier will be disposed for sliding into that slot 9, to provide an overlapping of the length ends, as can be seen in FIG. 1, as at 10. In addition, as can also be seen in FIG. 1A, the weakening groove 6, forming the living hinge between the upright leg 4, and the base member 2, is quite accurately disclosed.

As further noted in FIG. 1, a cut-out segment, as at 11, may be made within one side of the base member, in order to provide clearance for the locating of the fence post P, as the lengths are installed along the fencing material. In addition, once cut, and located into place, any segment of the base member 2 may be adhered or otherwise glued into position, to spanned the remaining open portion of the slot 11, to provide coverage thereat, and prevent the growth of weeds or grass at that proximity of the fence post P.

FIGS. 3 and 4 disclose a variation upon the barrier means of this invention. As noted, in this particular instance, the fence F and post P have affixed to their lower ends an L-shaped barrier means 12. It comprises an upright leg 13, fabricated not too unlike that which has been previously described at 4 for the vegetation barrier 1, as previously explained. Integrally formed at the bottom of the barrier 12 is one-half of a base member, as at 14, and which is designed for fitting under the lower edge of the fence F, straddling the post P, being cut in the manner as previously described, as with regard to the formed slot 11, as aforesaid, to provide clearance around the post P for insertion of the barrier means 12. A tie means 15 comprising any form of plastic tie, or twister, may be used in conjunction with a connector strip or strap means 16, for affixing the vegetation barrier in place. These tie means 15 may include the usage of that style of tie comprising a length of plastic, that fits into an apertured boss, and wherein is included a directional metal tab, in order to lock the tie within the boss when tightened. These are available in the art. As can be seen in FIG. 4, the back end of the barrier 12 inserts within the slotted end of the next axially adjacent barrier 13, 17, through the extension of a slot, as at 18, that extends some distance, approximately two or four inches, inwardly from the end of the barrier 17, and at the juncture between its upright leg 13 and the base member 14, as previously explained.

As explained in these various figures, a variety of apertures, such as the shaped apertures 19 and 20, as shown, may be provided within the upstanding legs 4 or 13, of the disclosed vegetation barriers, in order to accommodate the flow of moisture therethrough. These apertures may be widened at the bottoms, as shown for the apertures 20, in order to accommodate the flow of any water therethrough that accumulates at the barrier, as during a heavy rainfall. These barriers may be punched into the upright legs for these vegetations barriers, after they are extrusion molded from a polymer.

As can be seen in FIGS. 5 through 7, another variation upon the vegetation barrier of this invention is disclosed. In this particular instance, it comprises only a base member 20, that extends for the length as previously explained, and has a downwardly extending base in the form of an integral ridge formed along its under central surface, as at 21, to provide reinforcement thereat, but likewise, to provide a means for furnishing interconnection of the various lengths together. For example, a slot, as at 22, is formed between the depending ridge 21, and the undersurface of the base member 20, and such slot may extend in approximately 2" to 4". Then, the opposite end of each barrier, as at 23, is void of the depending ridge, so as to provide for the sliding insertion of that end of each base member into the slotted end 22 of the next axially aligned and installed barrier. Hence, there is overlapping that is achieved between adjacent barriers when laid into their applied positions. As can also be seen in FIG. 5, a slot may be cut, as at 24, into the base member 20, to provide clearance for the installed fence post P, and then a segment, as at 25, of base member may be applied thereunder, and glued or otherwise fastened in place, so as to provide full coverage for the barrier even at the location of its positioned post P. Thus, this prevents a growth of weeds or grass at said location. In addition, as can be seen in FIG. 7, various spikes, such as the plastic or other material spikes 26, may be inserted through the apertures 27, and hammered into the ground, in order to assure the retention of the base member, into its fixed position.

FIGS. 8 and 9 disclose yet a further modification upon this invention. In this particular instance, the vegetation barriers are once again constructed having only a base member 28, similar to the formed base member of FIG. 5, but in this particular instance, incorporates a pair of downwardly depending integral bosses or ridges 29 and 30, as noted. Once again, slots, as at 31, are furnished, to accommodate the insertion of the opposite end, as at 32, of the next adjacent aligned and installed vegetation barrier, when a plurality of lengths of these barriers are installed under a continuous length of fence. This, some overlapping occurs at these aligned and installed ends of the these vegetation barriers, to assure complete coverage of the ground thereunder. In addition, as can be noted in FIG. 8, a variety of slots, as at 33 or 34, may be cut into the base member 28, to accommodate the insertion of a fence post P therein, as noted in FIG. 9, in order to add that type of clearance to the usage and application of this invention, during its installation. Furthermore, a piece of remnant material, as at 35, may be adhered to the underside of the installed barrier, to provide complete closure around even the fence post, upon which these barriers may be installed. In addition, as shown in FIG. 9, a spike means, as at 36, may be located through various of the apertures, as at 37, to provide for the permanent fixing of the barrier in place, to the ground, and the spike means 36 may even include various integral barbs, as at 38, to secure the spikes in place, when driven into the ground, and to prevent their rising up from the same, once installed.

The uniqueness of this particular invention, as summarized and explained herein provides for its usage primarily in conjunction with fencing material. On the other hand, the style of L-shaped barrier, as shown in FIGS. 3 and 4, may yet be used against foundation walls, buildings, or the like, in order to prevent the growth of grass and weeds thereat. In addition, the locating of these type of vegetation barriers under fencing, as shown in FIGS. 1 and 3, with their upstanding legs that are appended to the adjacent fence, also prevents the passage of animals, such as small dogs, or the like, from passing under the fence and into an adjoining yard. Furthermore, as noted in FIG. 1, a variety of the apertures 8 are provided, along the upstanding leg 4, so as to assure that there will at least be a pair of apertures through which the tie means may cooperate when fixing the vegetation barrier to the adjacent fence, and its strap means 16, in order to properly align the tie means with any fencing material, and whether it be a chain link style of fence, chicken wire fences, hog wire fences, or even wood fences. These are examples of the variety of uses that can be made for the various vegetation barriers, in their modifications, as shown and explained herein.

Various modifications or variations upon the vegetation barrier of this invention as described herein may occur to those skilled in the a t upon reviewing the subject matter of this disclosure. Such variations or modifications, if within the spirit of this invention, are intended to be encompassed within the scope of any claims to patent protection issuing upon this development. The description of the preferred embodiment set forth herein is done so for illustrative purposes only.

Having thus described the invention what is claimed and desired to be secured by Letters Patent is:

1. A length of vegetation barrier for use under a fence and for eliminating the growth of grass, weeds, and the like, in the vicinity of the lower edge of such fencing, or other structures, and wherein a series of such lengths of barriers are longitudinally connected end-to-end to form a continuous vegetation barrier under such fencing, comprising, a base member provided for location under the lower edge of such fencing, and upon the ground, said base member having a width for extending laterally to at least one side of the fence to allow clearance for any lawn mower or other cutter to at least partially override thereon during lawn trimming, said base member having an upper surface therefor, an upstanding leg integrally formed and extending upwardly for the length of the base member, said upstanding leg extending upwardly for a distance to allow for its fixation to a fence, and interlocking means provided at least at one end of each length of barrier, for connection end-to-end with the next adjacent length of barrier, said interlocking means comprising there being an open ended slot provided proximate the location of connection of the upstanding leg with the base member for the barrier, and said slot extending into the barrier a fixed distance from one end thereof, said slot having a height approximating the thickness of the base member and provided for accommodating the insertion of the end of the next adjacent length of barrier for providing an interconnection of a series of lengths of vegetation barrier together, said interlocking ends of the adjacent lengths of barrier overlapping to provide continuity of coverage in the functioning of the installed barrier for overlying the vegetation throughout the length of the fence to which it attaches.

2. The invention of claim 1 and wherein said base member extending laterally to either side of the fence, said upstanding leg integrally formed and extending the length of the base member approximately near the upper center of said base member.

3. A length of vegetation barrier for use under a fence for eliminating the growth of grass, weeds, or the like, in the vicinity of the lower edge of fencing, or other structures, and wherein a series of such lengths of barriers are longitudinally connected end-to-end to form a continuous vegetation barrier under such fencing, comprising, a base member provided for location under the lower edge of such fencing and upon the ground, and said base member having a width for extending laterally to either side of the fence to allow clearance for any lawn mower or other cutter to at least partially override thereon during lawn trimming, said base member having an upper surface with a center therefor, an upstanding leg integrally formed and extending for the length of the base member approximately near the upper center of said base member, and extending upwardly for a distance to allow for its fixation to any fence, interlocking means provided at least at one end of each length of barrier, for connection with the end of the next adjacent length of barrier, said interlocking means including a downwardly extending boss integrally formed from the base member approximately at least at one end thereof, said base member having an under surface and said boss extending integrally downwardly therefrom, said box having an open ended slot provided between it and the under surface of the base member, said slot having a height approximating the thickness of the base member and designed for accommodating the insertion endwise of the base member at the end of the next adjacent length of barrier for providing a continuous interconnecting of the various lengths of vegetation barriers together throughout its extent.

4. The invention of claims 2 or 3, and including spike means extending through said base member and embedded in the ground.

5. The invention of claim 4 and wherein said spike means being barbed to sustain its retention of said spike means in the ground and locating of the vegetation barrier in fixed position.

6. The invention of claims 2 or 3, and wherein said vegetation barrier being formed of a polymer.

7. The invention of claim 6 and wherein said polymer including an ultraviolet ray inhibitor.

8. The invention of claim 6 and wherein said polymer comprising polypropylene ethylene.

9. The invention of claim 6 and wherein said polymer comprising polyethylene.

10. The invention of claim 6 and wherein said polymer comprising polypropylene copolymer.

11. The invention of claim 6 and wherein said polymer comprising polyurethane.

12. The invention of claims 2 or 3, and wherein said base member including at least one laterally extending open ended slot for accommodating the insertion of any fencing post therein during installation of the vegetation barrier.

13. The invention of claims 2 or 3, and including a tie means securing said upstanding leg to the fence, a connector strip cooperating with the tie means for facilitating the securement of the barrier to any associated fence.

14. The invention of claim 13 and wherein said connector strip including a series of apertures for accommodating the insertion and attachment of the tie means therethrough for facilitating the securement of the barrier to any associated fence.

15. The invention of claim 2 and wherein said base member being convexly formed transversely along its width to provide for the substantially flush mounting of the vegetation barrier upon the ground.

16. The invention of claim 2 and wherein said upstanding leg having at least one aperture provided therethrough to facilitate the attaching of the said barrier to any associated fence or other structure.

17. The invention of claim 16 and including a series of apertures provided through the said upstanding leg to accommodate the attachment of tie means to facilitate the securement of the barrier to any associated fence.

18. The invention of claim 2 and including at least one drainage hole opening provided through the upstanding leg to allow rain, water, or the like to flow past the barrier.

19. The invention of claim 18 and wherein there being a series of drain openings provided through the upstanding leg and spaced along the length of said leg.

20. The invention of claim 19 and wherein select of said drain openings being widened at its bottom edge to facilitate the flow of water therethrough.

21. The invention of claim 2 and including a weakening groove provided along the upstanding leg at the region of its integral connection with the base member to furnish a living hinge for facilitating the folding over of the leg upon the said base member to facilitate its shipment and storage.

22. The invention of claim 21 and wherein said interlocking means includes a downwardly extending boss integrally formed from the base member proximate at least at one end, said boss having a slot provided between it and the undersurface of the base member, and designed for accommodating the insertion of the proximate end of the next axially adjacent length of barrier for providing an interconnecting of the various length of vegetation barrier together throughout its extent.

* * * * *

UNITED STATES PATENT AND TRADEMARK OFFICE
CERTIFICATE OF CORRECTION

PATENT NO.   : 4,903,947
DATED        : February 27, 1990
INVENTOR(S)  : George D. Groves It is certified that error appears in the above—identified patent and that said Letters Patent is hereby corrected as shown below:

Claim 3, column 9, line 34, change "box" to ---boss---.

Signed and Sealed this

Twenty-sixth Day of March, 1991

*Attest:*

HARRY F. MANBECK, JR.

*Attesting Officer*           *Commissioner of Patents and Trademarks*